(12) United States Patent
Islam

(10) Patent No.: US 8,719,337 B1
(45) Date of Patent: May 6, 2014

(54) IPV6 TO WEB ARCHITECTURE

(76) Inventor: Junaid Islam, San Jose, CA (US)

(*) Notice: Subject to any disclaimer, the term of this patent is extended or adjusted under 35 U.S.C. 154(b) by 848 days.

(21) Appl. No.: 12/799,631

(22) Filed: Apr. 27, 2010

Related U.S. Application Data

(60) Provisional application No. 61/173,151, filed on Apr. 27, 2009.

(51) Int. Cl.
*G06F 15/16* (2006.01)

(52) U.S. Cl.
USPC ............ 709/203; 713/150; 709/222; 709/230

(58) Field of Classification Search
USPC ............................ 709/203, 222, 230; 713/150
See application file for complete search history.

(56) References Cited

U.S. PATENT DOCUMENTS

| | | | |
|---|---|---|---|
| 6,674,758 B2 | 1/2004 | Watson | |
| 6,865,184 B2 | 3/2005 | Thubert et al. | |
| 7,009,984 B2 | 3/2006 | Watson | |
| 7,031,328 B2 | 4/2006 | Thubert et al. | |
| 7,149,225 B2 | 12/2006 | Thubert et al. | |
| 7,207,063 B1 | 4/2007 | Fluhrer | |
| 7,421,736 B2 * | 9/2008 | Mukherjee et al. | 726/15 |
| 7,453,887 B2 | 11/2008 | Thubert et al. | |
| 7,496,107 B1 | 2/2009 | Watson | |
| 7,516,486 B2 | 4/2009 | Olivereau et al. | |
| 2002/0026525 A1 | 2/2002 | Armitage | |
| 2002/0069278 A1 | 6/2002 | Forslow | |
| 2003/0204605 A1 | 10/2003 | Hudson et al. | |
| 2004/0070678 A1 | 4/2004 | Toyama et al. | |
| 2004/0100953 A1 | 5/2004 | Chen et al. | |
| 2005/0190273 A1 | 9/2005 | Toyama et al. | |
| 2006/0009213 A1 | 1/2006 | Sturniolo et al. | |
| 2006/0045068 A1 | 3/2006 | Wu et al. | |
| 2006/0098588 A1 | 5/2006 | Zhang et al. | |
| 2006/0123079 A1 | 6/2006 | Sturniolo et al. | |
| 2006/0159100 A1 * | 7/2006 | Droms et al. | 370/395.2 |
| 2006/0182100 A1 | 8/2006 | Li et al. | |
| 2006/0185012 A1 | 8/2006 | Olivereau et al. | |
| 2006/0227792 A1 | 10/2006 | Wetterwald et al. | |
| 2007/0050613 A1 * | 3/2007 | Islam et al. | 713/150 |
| 2007/0061871 A1 * | 3/2007 | Simpkins et al. | 726/4 |
| 2007/0245000 A1 * | 10/2007 | Chen et al. | 709/222 |
| 2008/0043758 A1 | 2/2008 | Giaretta et al. | |
| 2008/0281950 A1 | 11/2008 | Wald et al. | |

OTHER PUBLICATIONS

Thakolsri et al., "Transition Mechanism in IP-Based Wireless Networks," Applications and the Internet Workshops, 2004, Saint 2004 Workshops, 2004 International Synposium Jan. 26-30, 2004, pp. 112-119.

Jeong et al., "Dynamic Tunnel Management Protocol for IPv4 Traversal of IPv6 Mobile Network," Vehicular Technology Conference, 2004, VTC 2004-Fall 2004, IEEE 60th, vol. 7, Sep. 26-29, 2004, pp. 4754-4757.

* cited by examiner

*Primary Examiner* — Azizul Choudhury
*Assistant Examiner* — James Forman
(74) *Attorney, Agent, or Firm* — Aka Chan LLP

(57) ABSTRACT

A system allows first users to connect through an IPv4 web interface to access content (e.g., information and services) of second users who provide the content using IPv6. The second users are effectively mobile web servers. In an implementation, the system is a streaming media network (e.g., lifecasting) where first users are video viewers and second users are streaming video providers. In the system, a second user runs a home agent client (e.g., plug in) that connects to a home agent server using IPv6. The home agent client and server encapsulate and deencapsulate the IPv6 information. Information is transmitted and routed using IPv6 in an IPv4 environment. Any number of second users connect to the first user's content via an IPv4 web interface.

20 Claims, 4 Drawing Sheets

US 8,719,337 B1

IPV6 TO WEB ARCHITECTURE

CROSS-REFERENCE TO RELATED APPLICATIONS

This patent application claims the benefit of U.S. provisional application 61/173,151 filed Apr. 27, 2009, which is incorporated by reference along with all other references cited in this application.

BACKGROUND OF THE INVENTION

This invention relates to the field of digital communications, and more specifically to systems and techniques for exchanging information running a first Internet protocol (e.g., IPv6) in a second Internet protocol environment (e.g., IPv4).

New developments in information technology hold great promise for businesses, governments, academics, and consumers alike. Demand continues to escalate for "always-on" connectivity, mobility, and security. Each new day sees the introduction of new and improved Internet Protocol (IP)-enabled devices—each requiring an IP address so that they can participate in a computer network.

The Internet Protocol version 4 (IPv4) address space is being depleted due to the enormous growth of the Internet. In response, a new addressing system—Internet Protocol version 6 (IPv6) was developed. IPv6 networks offer increased address space for the growing number of web sites and IP-enabled devices. IPv6 also provides more security over IPv4 networks.

One application that IPv6 is well-suited for is mobile web casting, where one person can transmit content to a number of users from one casting (e.g., video stream). Live video streaming can be used for many diverse purposes such as broadcasting news, connecting friends and relatives in online chat rooms, conducting businesses online face to face, selling products and services, teaching online courses, monitoring properties, showing movies online, and so on.

However, one challenge to transitioning to IPv6 is compatibility with IPv4 networks and devices. Simply replacing the old components with the new components is in many cases prohibitively expensive. What is needed are tools, systems, and techniques for translating information between IPv6 and IPv4 standards.

Therefore, there is a need for an improved system and method for exchanging information between different Internet protocols.

BRIEF SUMMARY OF THE INVENTION

A system allows first users to connect through an IPv4 web interface to access content (e.g., information and services) of second users who provide the content using IPv6. The second users are effectively mobile web servers. In an implementation, the system is a streaming media network (e.g., lifecasting) where first users are video viewers and second users are streaming video providers. In the system, a second user runs a home agent client (e.g., plug in) that connects to a home agent server using IPv6. The home agent client and server encapsulate and deencapsulate the IPv6 information. Information is transmitted and routed using IPv6 in an IPv4 environment. Any number of second users connect to the first user's content via an IPv4 web interface.

Aspects of the invention are applicable to many different types of web applications including video streaming, two-way chat, storage, e-mail serving, and many others. As an example, in a specific implementation, a system provides web developers the benefits of an Adobe Flash media server without the developers having to deploy one. The system provides the management functions of a stream server on a web interface. In this specific implementation, capacity is sold on demand, i.e., no upfront investment is required.

With the system, any number of users using camera-equipped electronic devices (e.g., web cams or smartphones) can capture live video and stream the video to any number of viewing clients. In a specific implementation, the system overlays or provides a bridge between Internet Protocol version 4 (IPv4) and Internet Protocol version 6 (IPv6). IPv6 offers a number of advantages over IPv4 including, for example, larger address space, stateless address configuration, multicast, improved network layer security, simplified processing by routers, mobility, options extensibility, and jumbograms.

In a specific implementation, a system provides an easy-to-use and easy-to-implement solution to add live video to a web site. Currently web developers have to deploy their own Adobe Flash media server (or other streaming server) or use expensive webcast services if they want live video on their site—making live video too expensive for most applications. Existing services do not allow web developers to embed video into their site or provide management tools. The system provides a web-based video distribution network—i.e., a virtualized video server.

The system provides web developers all of the benefits of having their own Adobe Flash media server without needing to deploy one. The system (1) provides all of the management functions of a stream server on a web interface and (2) selling capacity on demand (no upfront investment required). Further features of the system are discussed below.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
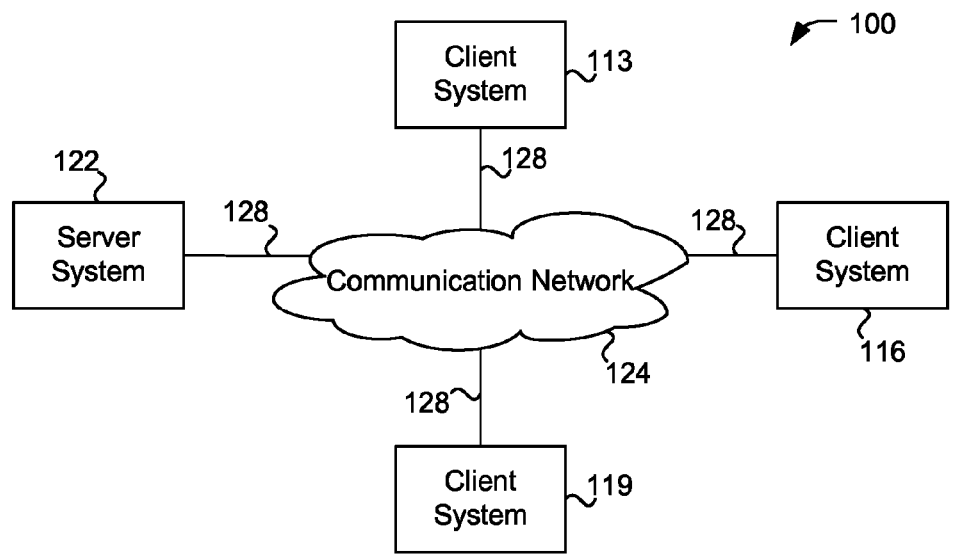
FIG. 1 shows a simplified block diagram of a client-server system and network in which an embodiment of the invention may be implemented.

FIG. 1 is a simplified block diagram of a distributed computer network 100 incorporating an embodiment of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client and a server depending on whether the computer system is requesting or providing information. Additionally, although aspects of the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

According to the teachings of the present invention, client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer browser program provided by Microsoft Corporation, and the Firefox browser provided by Mozilla, and others.

Figure 2:
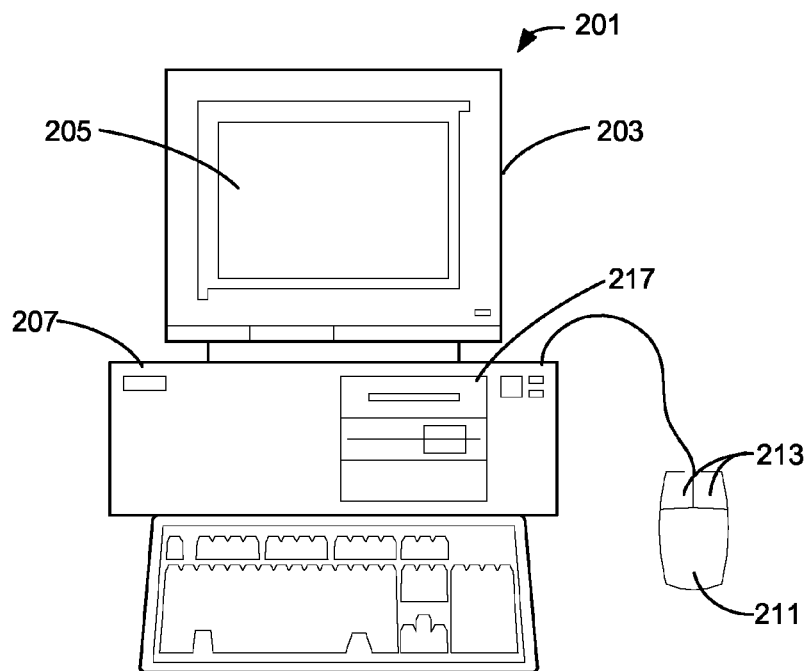
FIG. 2 shows a more detailed diagram of an exemplary client or computer which may be used in an implementation of the invention.

FIG. 2 shows an exemplary client system (or server system) of the present invention. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version (e.g., a computer program product) of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
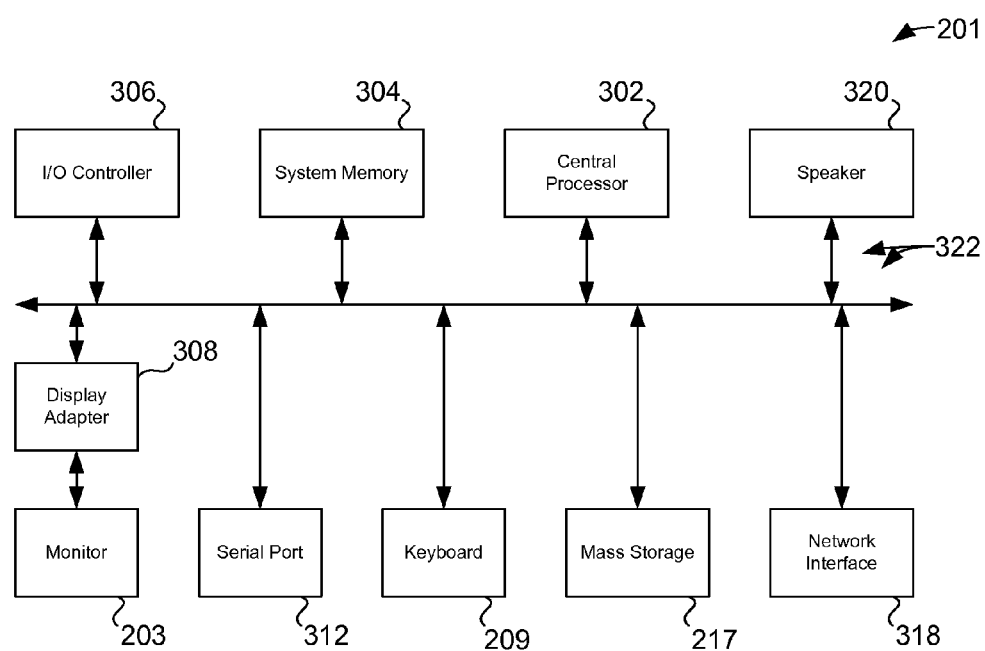
FIG. 3 shows a system block diagram of a client computer system used to execute application programs such as a web browser.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www.mathworks.com), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

The system allows users to create mobile web servers. These web servers connect to the system using IPv6 in an IPv4 environment. The web servers can provide storage, inactive services, or any other content or web application. Web servers can be implemented at any location and run on any type of device including computer, smartphone, NAS or embedded Linux box, set-top box, or other. Other users connect to the system to access the content of these mobile web servers using the web.

The invention is applicable to any type of communication between IPv6 and IPv4 entities. Some examples of applications include real-time video conferencing, real time media streaming, real time stock quote streaming, directory services, and on-line games—just to name a few examples. Aspects of the invention are applicable to file servers, web servers, database servers, print servers, and the like.

This patent application provides an example of a specific implementation—a streaming video distribution system—of a system the invention. Video sources stream using IPv6 over IPv4, while video viewers receive content using web browsers over IPv4.

Figure 4:
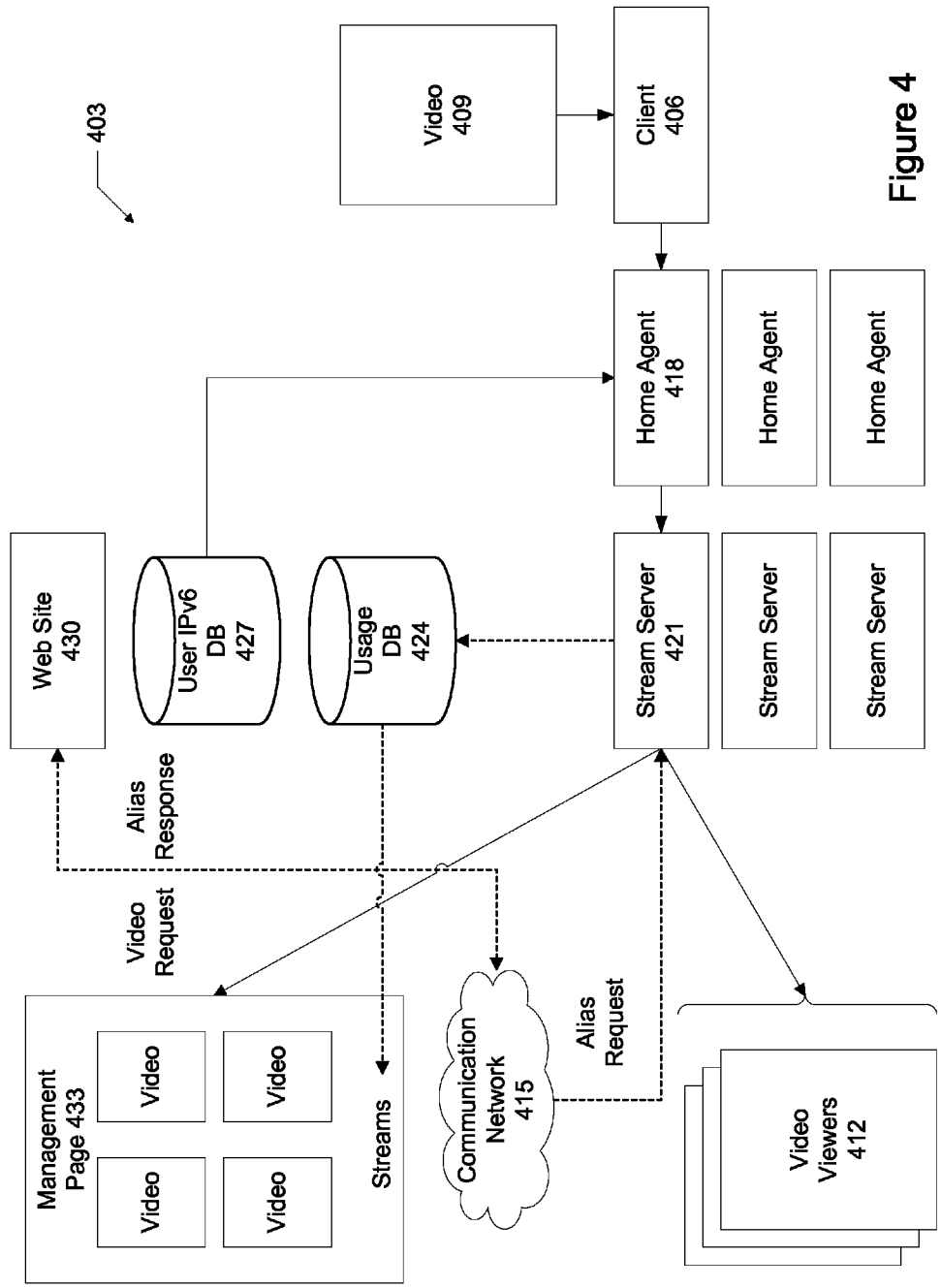
FIG. 4 shows a block diagram of a specific implementation of a system architecture of the invention.

FIG. 4 shows a block diagram of a system architecture 403 for distributing video. A home agent client 406 streams a video 409 over the system using IPv6. The video is viewed by video viewers 412 using a web interface using IPv4. There is a communication network 415, a home agent routing server 418, a stream server 421, a usage database 424, a user IPv6 database 427, a web site 430 and a management page 433. There can be any number of home agent clients and video viewers.

Home agent server 418 is representative of a pool of such servers. As the number of home agent clients increases, the number of home agent servers increases to handle the load. When a client requests an IPv6 connection, the client is connected to any one of the home agent servers. Features of the home agent can include dual or multiple redundant home agents, edge or original Wowza media server, or others, or any combination of these.

Similarly, stream server 412 is representative of a pool of such servers. As the number of viewers increases, the number of stream servers increases to handle the load. When a viewer requests a video, the viewer is connected to a stream server to show the video to the viewer. If the number of users who request the same video increases to a level (which can be set by the system administrative) at which a single stream server cannot handle the load, the system can replicate the video stream on another stream server so the video viewer can view.

In a specific implementation, the communication network is the Internet. Users can connect via using wires or wirelessly. Principles of the invention are also applicable to other communication networks (or combinations of communication networks), especially where it is desirable to create a connection using a protocol that is not native to the network environment in which it will be established.

Details for an example of a client are described above and shown in FIGS. 2-3. Further, in a specific implementation, client 406 streams the video via a 6-over-4 connection to the home agent server. Typically, every client is associated with a unique IPv6 address. The unique IPv6 address is used to identify the URL, for management purposes (e.g., billing), or both. In a specific implementation, the client leverages the Microsoft IPv6 stack. This allows, for example, other applications such as chat, desktop collaboration, or both, to run across the system.

Web site 430 provides the video viewer users a front end. That is, the web site provides the software interface (e.g., graphical user interface) to enable user-friendly interaction with the system. Some examples of functions that are provided by the web site include administration (e.g., password) and account setup. Some other features provided by the web interface can include group admin features, real usage stats, web-based control of clients within a group, and others, and in any combination.

The web site receives video stream requests from video viewers through the communication network (e.g., Internet), checks the usage database, and generates a response based on usage parameters. Some examples of parameters include a threshold number of simultaneous streams (e.g., 1000 streams) and a threshold number of stream hours (e.g., 100 stream hours).

In this specific implementation, the web site provides a billing interface. The billing interface can be used by a company to bill its customers. Customers can view usage data on the management page and decide whether or not they desire additional capacity.

Client 406 runs a home agent application. This home agent application can be desktop application or plug-in, such as a browser plug in. The home agent application may be written using a platform-independent language such as Java, or alternatively a platform-dependent language such as C++.

Via the home agent application running at the client, the client computer can connect to home agent routing server 418 using a IPv6 connection which runs over the IPv4 environment. Some more details on creating an IPv6 connection over IPv4 is discussed in U.S. patent application Ser. No. 11/468,281, filed Aug. 29, 2006, which is incorporated by reference along with all other references cited in this application.

Home agent routing server 418 performs routing of IPv6 data on layer 3 or the OSI model. This is contrast to a typical web server which processes data on layer 4 or above OSI model. In comparison, the home agent routing server is much more efficient at routing information than a web server. In the same environment, a single IPv6 home agent routing server will be able to handle about three times or more connections than a web server because the home agent can route much more efficiently, with less overhead.

Further, in a video streaming web site implementation, the home agent client can also perform transcoding of the video into the format to be provided to users through the web site. For example, the video may be streamed from a webcam at client 406 using MPEG-2, and then converted by the home agent client to an Adobe Flash format to transmit, using IPv6, to the home agent server. The video stream can be provided in any format and converted to other formats or resolutions (e.g., Microsoft Silverlight, Apple QuickTime, h.264, DivX, Xvid, RealNetworks RealMedia, and others).

The home agent server deencapsulates the 6-over-4 tunnel and makes the IPv6 video stream viewable by the IPv4 Internet to viewing users through the web site. The home agent server supports native IPv6 routing. This allows the home agent to distribute streams to other home agents across the Internet. The home agent can be topologically and geographically distributed across the Internet. For example, users in Asia may be directed to an Asian home agent by the IPv6 database.

Some features of the home agent plug-in client can include: host-based address, generic client user sign in, video and audio modes, native IPv6 support, remove bandwidth control, chat and HTML, and others, and in any combination.

The IPv6 database stores or maintains a list of active IPv6 accounts. This information is propagated to the home agents. The IPv6 database directs clients to the desired home agent based on topological proximity, load, or both.

The IPv6 database may also support any number of housekeeping functions. Some examples of housekeeping functions include monitoring the health of the home agents (e.g., Internet connectivity, load, CPU utilization, and the like). Such health data may also be used when making load balancing decisions.

The usage database collects stream data based on stream identification and consolidates it by account. The usage database can support the display of real time information on the management page. For example, musicians broadcasting a concert on Facebook (or any other social networking web site) will be able to monitor how many fans are watching in real time.

In a specific implementation, usage is tracked based on stream hours, bandwidth, or both for billing purposes. Furthermore, in addition to billing, the usage data may be used to ensure that free beta users do not consume too much system capacity.

The stream server replicates video streams. The stream server can generate the usage data required for management and billing purposes. Two or more stream servers can be pooled to increase capacity independent of the home agents.

Although a stream server can run on a home agent (e.g., integrated on a single machine, such as using server virtualization), in a specific implementation, video viewers will only connect to stream servers and not to home agents. In this specific implementation, the IPv4 addresses of the home agents will be hidden. This allows for security and scalability.

Some features of the system are discussed below. A system may include any one or more of the features described, in any combination.

1. Streaming one or more live videos. Video streams are addressed via URLs, allowing application developers to embed one or more live streams into a web page with the same ease as posting a picture. The system's multistream capability also enables a content rich, saturated web experience. For example, in addition to making it easier to webcast a conference, event organizers can simultaneously stream the speaker, the audience and questioner to create an enhanced web experience.

2. Real-time monitoring and capacity management. The system provides site managers with real time statistics on the number of viewers, duration, or both. Additionally, usage data such as usage data by geographic location may be made available on the web interface.

In a specific implementation, payment of the system is based on a tiered capacity model. For example, users may be given a limited number of free hours which increases based on capacity purchased. This pay-as-you-go model allows developers to test applications without any upfront capital investment. Web site managers are able to monitor the level of activity on their site and purchase more capacity as needed.

In a specific implementation, capacity is offered on a stream, hour, or user basis, or combinations of these. As an example, $10 may buy 100 streams per hours. This can be, for example, 1 stream running 100 hours, 10 streams being watched by 10 people for an hour, or 1 steam being watched by 100 people for an hour.

3. Switching the source of a displayed stream. The system's large addressing enables video switching via a web interface. By having a first set of URLs for video streams and a second set of URLs for external addressing, web developers can dynamically switch video sources. This can be similar to a video switch, but without hardware.

Web-based video switching can be designed to create a compelling video experience while maximizing the value of bandwidth. For example, site managers could select from multiple camera angles at a conference to get the desired (e.g., best) shot.

4. Control the bandwidth of multiple streams. The system's embedded control channel enables web site administrators to control the output of multiple streams simultaneously. Subsequently, administrators can tailor the level of bandwidth to optimize the experience for viewers. For example administrators wanting to create large (e.g., 30) image page may desire a low level of bandwidth and small image size per stream. Alternatively, a conference organizer may desire to use a high-definition stream for the speaker and smaller, low bandwidth streams for the audience.

5. Video record and playback. The system allows web site administrators to record live content via the web interface. Recorded content can be played back as a loop or integrated into a live event leveraging the video switching feature. For example, a conference organizer may desire to record the webcast proceeding for live and off-line viewing. The webcast itself may be composed of switched feeds. One or more of the switched feeds can include prerecorded video.

6. On-demand capacity provisioning and purchasing. The system is able to monitor stream usage in real time and modulate how much capacity a single stream can be absorb by simply limiting response—i.e., the request may be redirected to a stream server. Thus, the systems customers can not only view what their usage is in real time but also purchase more capacity as needed.

7. Bandwidth efficiency. In a specific implementation, the clients function as web servers and as such do not transmit video unless a viewer is watching the stream. When the client activates a webcam, an IPv6 binding update message is sent to the home agents but no video traffic.

8. Scale and redundancy. Clients and video viewers, or both, are directed by either the web site or IPv6 database to the desired stream server and home agent based on load. The stream servers and home agents can be topologically distributed across the Internet.

9. Native IPv6 support. The combination of the clients' IPv6-over-IPv4 connection and the home agent's ability to route IPv6 flows enables native IPv6 support (as well as connectivity to the 6bone legacy IPv6 and Internet2). The system can be used by academic and commercial application developers such as Microsoft. Furthermore, the system can seamlessly integrate into third generation (3G) networks which are IPv6 based.

Figures 5A, 5B:
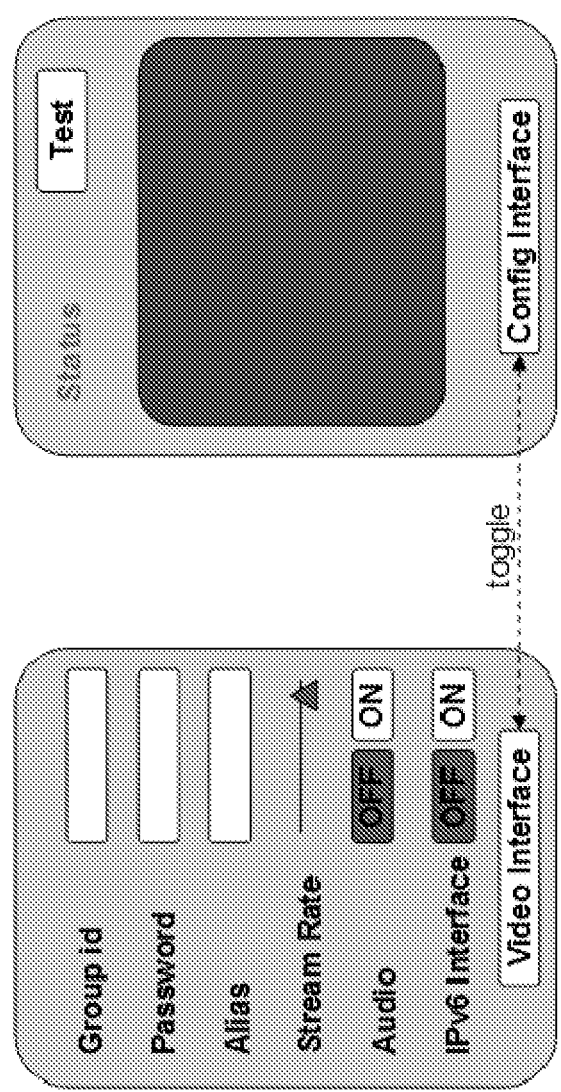
FIGS. 5A and 5B show a configuration and video GUIs for a home agent client application.

FIGS. 5A and 5B shows a configuration and video GUIs for a home agent client application.

FIG. 5A shows the configuration GUI:

For the Group Id: 1-32 as defined by account admin. Example bob1, bob2, bob3, and so forth.

For the Group Password: Set by admin (which can be changed anytime). Password failure will prompt user to call admin.

For the Alias: Enables user to display a different screen name than default. Example: Frank versus bob 14.

For the Stream Rate: Enables user increase or reduce transmit rate of webcam. Default set to HIGH.

For the Audio mode: Defaulted to OFF. ON turns on microphone without activity detection (high quality).

For the IPv6 interface: Defaulted to OFF. ON enables access to IPv6 backbone

FIG. 5B shows the video GUI:

For Status: Camera not connected. Connected. Connection Failed (with reason).

For Test: Opens browser with native stream.

In an implementation, the system offer tunneled IPv6 access to a native IPv6 provider such as Hurricane Electric. Users will access native IPv6 web sites and run native IPv6 applications using the IPv6 address previously assigned by the system. The system may also have "IPv6 only" web site, in addition to IPv4 web site, which will have a search feature.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
providing a first home agent server, coupled to an Internet Protocol version 4 (IPv4) network, managing Internet Protocol version 6 (IPv6) clients and routing IPv6 information over layer 3;
providing a stream server, coupled to the first home agent server via the IPv4 network;
providing a first IPv6 client, coupled to the first home agent server via the IPv4 network;
from the first IPv6 client, sending information to the first home agent server comprising an IPv4 address, an IPv6 address associated with the first IPv6 client, and when no client is connected to a stream of the first IPv6 client, a binding update message without stream traffic;
implementing a first IPv6-over-IPv4 tunnel in the IPv4 network between the first IPv6 client and first home agent server;
through the first IPv6-over-IPv4 tunnel, transferring information from the first IPv6 client directly to the first home agent server in an encrypted form;
transferring the information from the first home agent server directly to the stream server in an unencrypted form without using the first IPv6-over-IPv4 tunnel;
providing a second home agent server, coupled to an Internet Protocol version 4 (IPv4) network; and
at the first home agent server replicating the information transferred from the first IPv6 client and transmitting the replicated information to the second home agent server.

2. The method of claim 1 comprising:
allowing a plurality of recipient IPv4 client devices to couple to the stream server via the IPv4 network, wherein each of the recipient IPv4 client devices is capable of receiving the information transferred from the first IPv6 client without using the IPv6-over-IPv4 tunnel to the stream server.

3. The method of claim 2 wherein each of the recipient IPv4 client devices cannot view an IPv6 address of the first IPv6 client.

4. The method of claim 2 wherein the first home agent server functions as a proxy for the first IPv6 client.

5. The method of claim 1 wherein the first home agent server is coupled to a IPv6 network and the method comprises:
providing a second IPv6 client, coupled to the first home agent server via the IPv6 network without using a IPv6-over-IPv4 tunnel.

6. The method of claim 1 comprising:
on the first IPv6 client, storing a home agent client executable code, wherein when executed the executable code causes display on a screen of the first IPv6 client a sign-on graphical interface comprising a password input.

7. The method of claim 1 wherein the information transferred from the first IPv6 client comprises a video stream.

8. The method of claim 1 wherein the stream server is a first stream server, and the method comprises:
providing a second stream server, coupled to the second home agent server via the IPv4 network; and
transmitting the replicated information from the second home agent server to the second stream server.

9. The method of claim 1 comprising:
at the first home agent server, decrypting the encrypted information from the first IPv6 client into unencrypted format.

10. The method of claim 1 comprising:
transmitting information streamed to the first home agent transmit video to the second home agent server via an IPv6 network.

11. The method of claim 1 comprising:
providing an IPv6 database comprises a list of IPv6 accounts, wherein information in the IPv6 database is propagated to the first and second home agents via an IPv6 network.

12. The method of claim 1 wherein the information comprises a video stream, and the video stream is streamed in a first format from the first IPv6 client to the first home agent server, the first home agent transcodes the video stream into a second format, and the video stream transcoded in the second format is streamed to the stream server.

13. The method of claim 1 wherein the first IPv6 client comprises a home agent client application executing at the first IPv6 client to assist in implementing the IPv6-over-IPv4 tunnel.

14. A method comprising:
providing a first home agent server, coupled to an Internet Protocol version 4 (IPv4) network, managing Internet Protocol version 6 (IPv6) clients and routing IPv6 data using layer 3;
providing a stream server, coupled to the first home agent server via the IPv4 network;
providing a first IPv6 client, coupled to the first home agent server via the IPv4 network;
from the first IPv6 client, sending to the first home agent server an IPv4 address and IPv6 address associated with the first IPv6 client, and when no receiver is connected to a stream of the first IPv6 client, sending a binding update message without video traffic;
implementing a first IPv6-over-IPv4 tunnel in the IPv4 network between the first IPv6 client and first home agent server;
through the first IPv6-over-IPv4 tunnel, transferring video information from the first IPv6 client directly to the first home agent server in an encrypted form;
transferring the video information from the first home agent server directly to the stream server in an unencrypted form without using the first IPv6-over-IPv4 tunnel;
providing a second home agent server, coupled to an Internet Protocol version 4 (IPv4) network; and
at the first home agent server replicating the video information transferred from the first IPv6 client and transmitting the replicated video information to the second home agent server.

15. The method of claim 14 wherein the video information is streamed in a first format from the first IPv6 client to the first home agent server, the first home agent transcodes the video information into a second format, and the video information, transcoded in the second format, is streamed to the stream server.

16. The method of claim 14 comprising:
a plurality of recipient IPv4 client devices, coupled to the stream server via the IPv4 network, wherein each of the recipient IPv4 client devices is capable of receiving the information transferred from the first IPv6 client without using the IPv6-over-IPv4 tunnel to the stream server.

17. The method of claim 14 comprising:
on the first IPv6 client, storing a home agent client executable code, wherein when executed the executable code assists in implementing the IPv6-over-IPv4 tunnel.

18. The method of claim 14 wherein the stream server is a first stream server, and the method comprises:
providing a second stream server, coupled to the second home agent server via the IPv4 network; and
transmitting the replicated information from the second home agent server to the second stream server.

19. A method comprising:
providing a first home agent server, coupled to an Internet Protocol version 4 (IPv4) network, managing Internet Protocol version 6 (IPv6) clients and routing IPv6 information over layer 3;
providing a stream server, coupled to the first home agent server via the IPv4 network;
providing a first IPv6 client, coupled to the first home agent server via the IPv4 network;
from the first IPv6 client, sending to the first home agent server an IPv4 address and IPv6 address associated with the first IPv6 client, and when no client is connected to a stream of the first IPv6 client, sending a binding update message without stream traffic;
implementing a first IPv6-over-IPv4 tunnel in the IPv4 network between the first IPv6 client and first home agent server;
through the first IPv6-over-IPv4 tunnel, transferring information from the first IPv6 client directly to the first home agent server in an encrypted form;
transferring the information from the first home agent server directly to the stream server in an unencrypted form without using the first IPv6-over-IPv4 tunnel;
providing a second home agent server, coupled to an Internet Protocol version 4 (IPv4) network; and
at the first home agent server replicating the information transferred from the first IPv6 client and transmitting the replicated information to the second home agent server;
on the first IPv6 client, storing a home agent client executable code, wherein when executed the executable code assists in implementing the IPv6-over-IPv4 tunnel; and
allowing a plurality of recipient IPv4 client devices to couple to the stream server via the IPv4 network, wherein each of the recipient IPv4 client devices is capable of receiving the information transferred from the first IPv6 client without using the IPv6-over-IPv4 tunnel to the stream server, and each of the recipient IPv4 client devices cannot view an IPv6 address of the first IPv6 client.

20. The method of claim 19 wherein the first home agent server functions as a proxy for the first IPv6 client.

* * * * *